April 9, 1957  P. E. LA TENDRESSE  2,788,139
RETRACTIVE LOADER
Filed Nov. 26, 1951  4 Sheets-Sheet 1
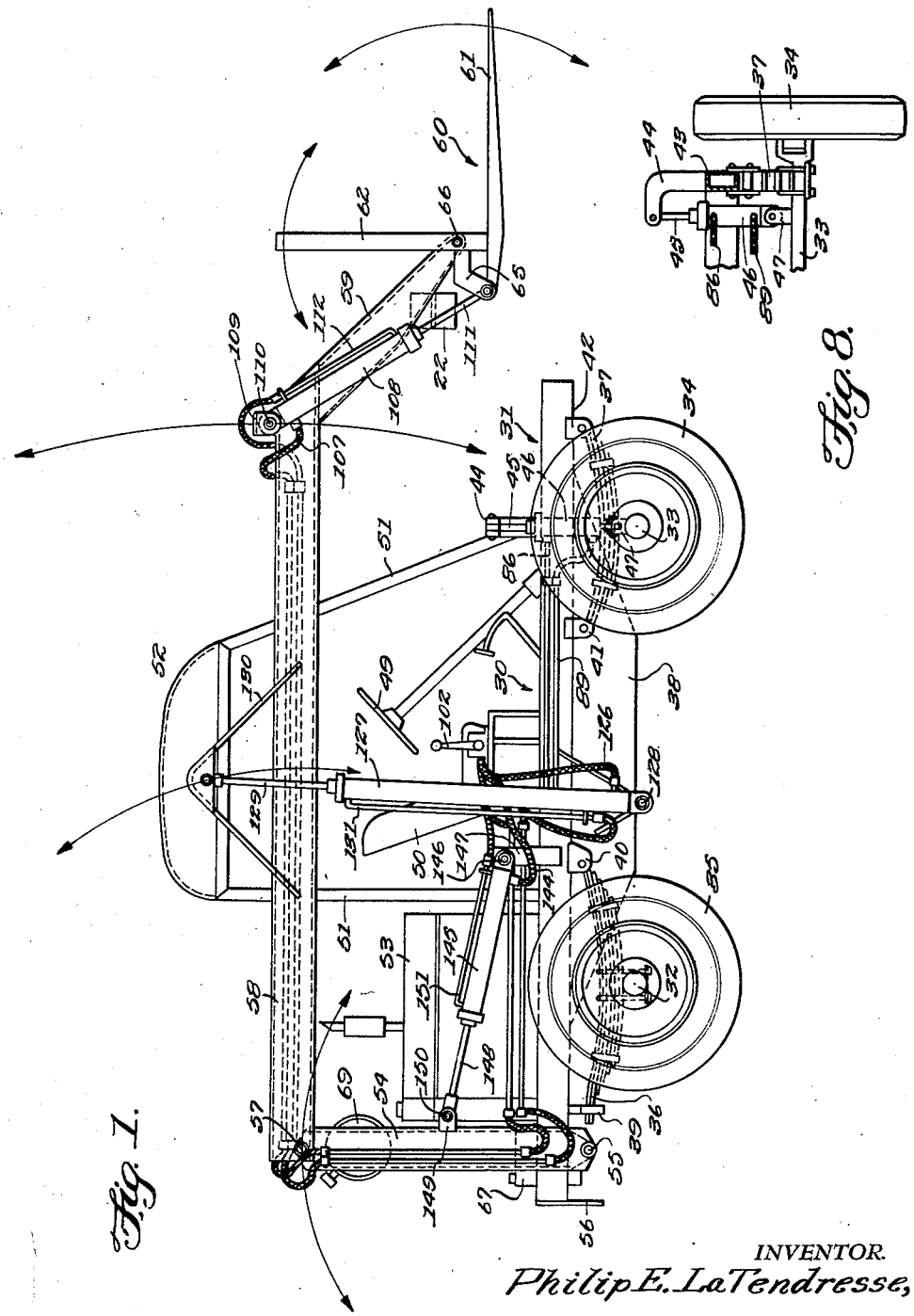
INVENTOR.
Philip E. LaTendresse,

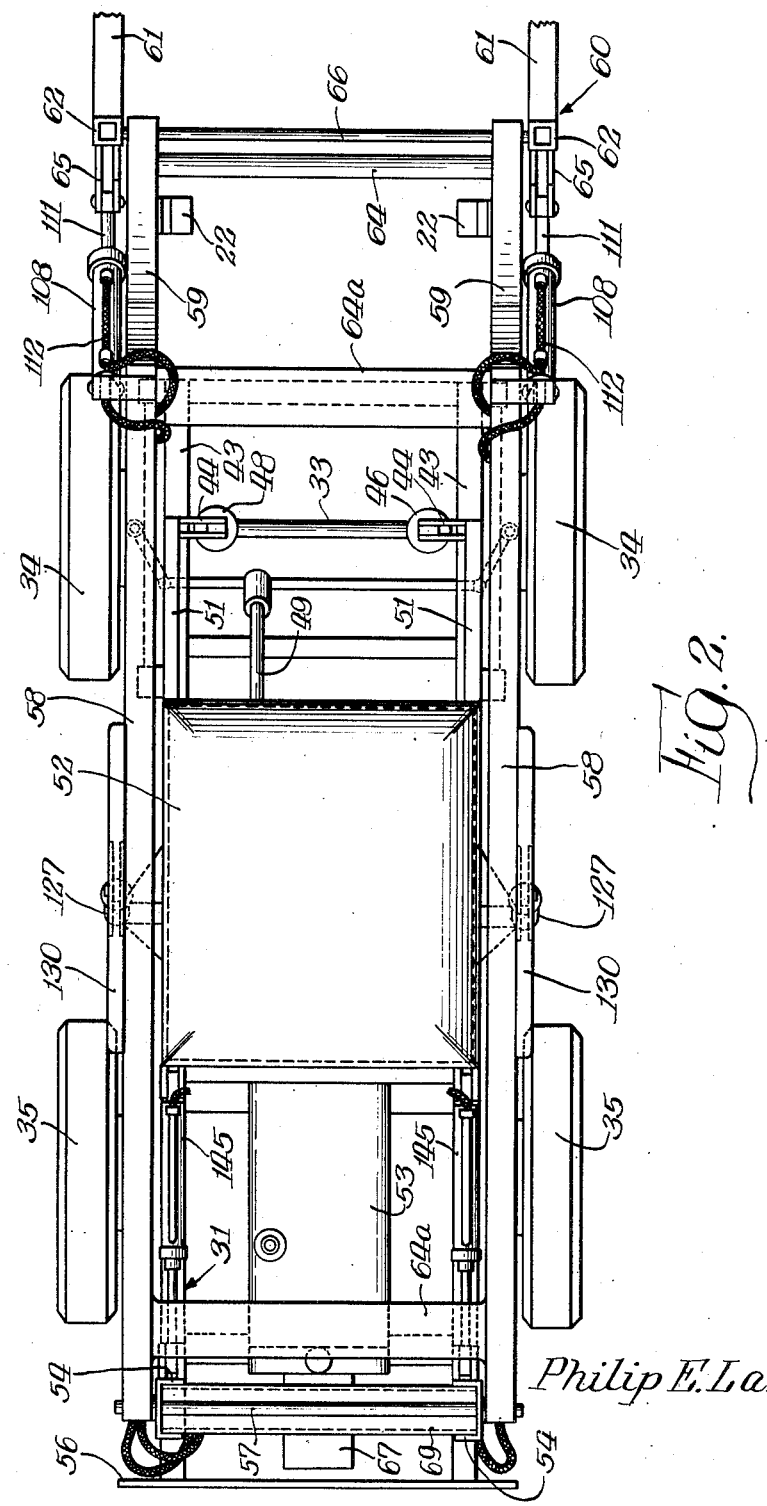

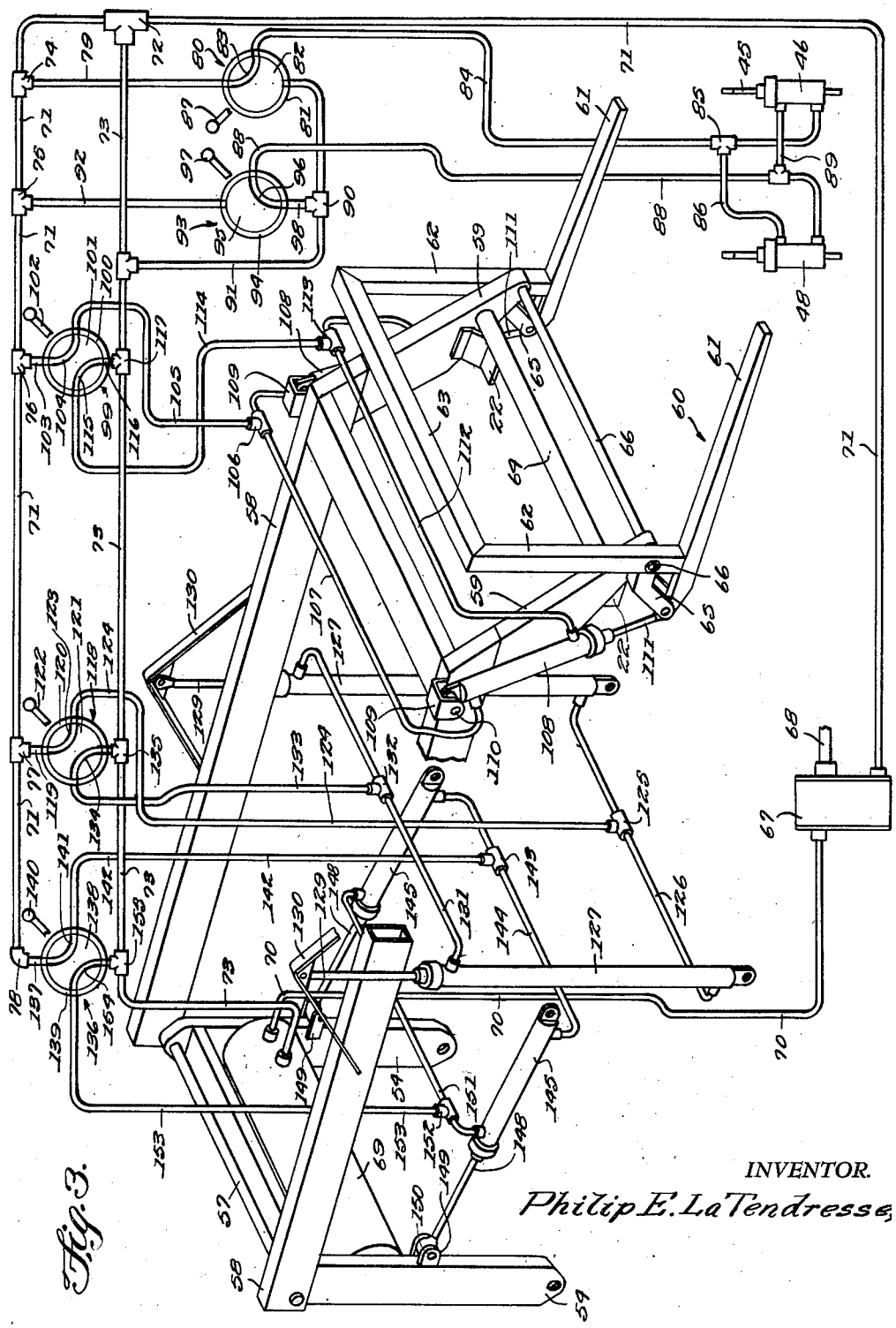

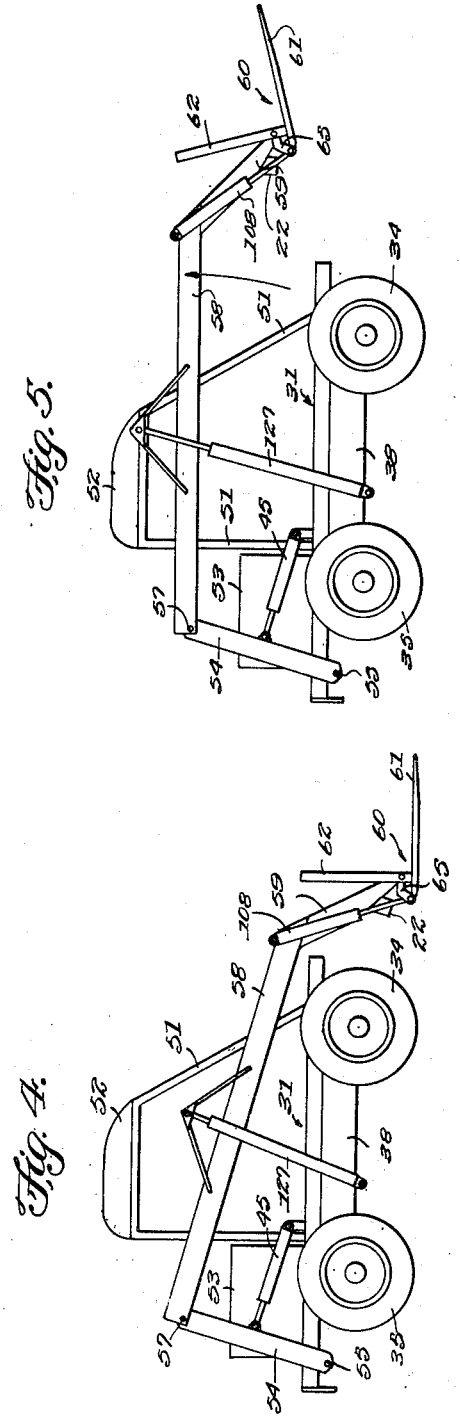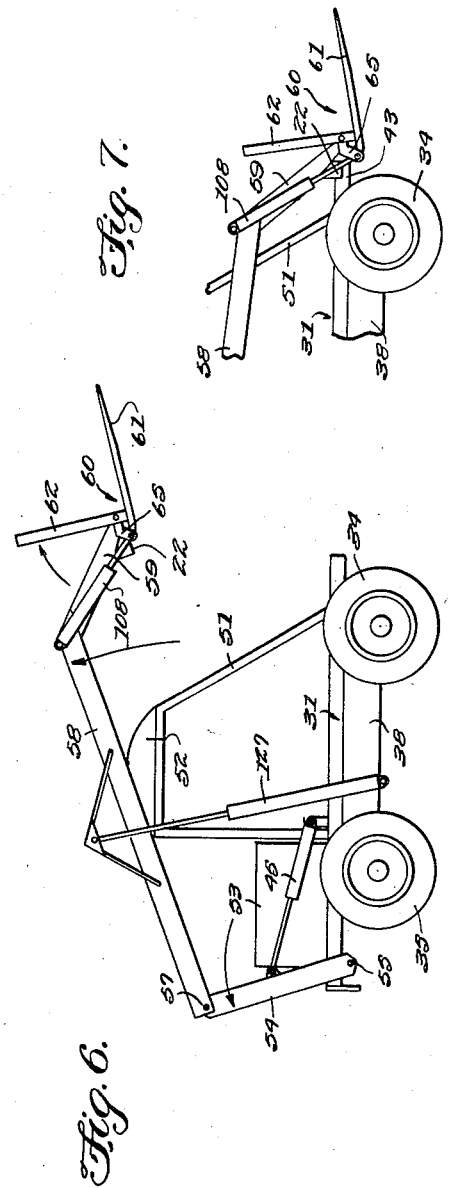

United States Patent Office 2,788,139
Patented Apr. 9, 1957

2,788,139
RETRACTIVE LOADER
Philip E. La Tendresse, Baraga, Mich.
Application November 26, 1951, Serial No. 258,246
8 Claims. (Cl. 214—141)

This invention relates to a machine for loading, lifting, carrying, and delivering various articles, such as logs or lumber.

An underlying object of the invention is to provide a machine that will facilitate the lifting, loading, carrying, and delivering of cargo or articles, such as logs or lumber.

An additional object of the invention is to provide a loader suitable for rough ground. To this end, one or more of several features may cooperate.

The machine may be constructed so that the center of gravity of the load being carried can be shifted back toward the front wheels to eliminate the danger of the machine tipping forwardly. The front axle of the machine may be adapted to be adjusted to compensate for uneven ground conditions, especially while stationary. The construction may enable the load to be set down on the chassis to relieve the boom of strain during transport. The boom may be limited against side sway by the cab.

A more specific object of the invention is to provide a loader which, though of simple construction, affords a wide variety of movements of the load-engaging portion. On rough ground, for example, the vehicle may remain in one spot and the carrier pushed forward smoothly to slide under the load to be picked up.

Still another object of the invention is to provide a lifting, loading and carrying machine wherein the loading or lifting fork can be adjusted or moved to various positions by means of an efficient hydraulic system which is under the control of the operator.

Another object of the invention is to provide a lifting machine for logs and the like in which the machine can be leveled or tilted sidewise to align a lifting fork with the bottom of a log to be able to slide under it.

A further object of the invention is to provide a machine which is extremely simple and inexpensive to manufacture.

This application is in part a continuation of my application Serial No. 208,033, filed January 26, 1951, now abandoned, the claims being intended to read on the disclosure thereof.

Other objects and advantages will be apparent during the course of the following description.

In the accompanying drawings, forming a part of this application, and in which like numerals are used to designate like parts throughout the same:

Figure 1 is a side elevational view of a machine constructed according to the present invention;

Figure 2 is a top plan view of the same machine, except for some slight modifications;

Figure 3 is a schematic view of the hydraulic system for the machine of the present invention;

Figure 4 is a side elevational diagrammatic view of the machine with the lifting fork in the lowered position;

Figure 5 is a view similar to Figure 4 but with the fork in an intermediate raised position;

Figure 6 is a view similar to Figures 4 and 5, but with the fork in full raised position;

Figure 7 shows the carrying position of the fork;

Figure 8 is a fragmentary detail sectional view showing the front leveling mechanism.

*General description*

Referring in detail to the drawings, the numeral 30 designates a wheeled vehicle which includes a chassis 31, and arranged below the frame of chassis 31 is a rear axle 32 and a spaced parallel front axle 33. Front wheels 34 are mounted on axle 33, while rear wheels 35 are mounted on axle 32. Suitable springs 36 are connected to rear axle 32, and the ends of springs 36 are supported by brackets 39 and 40 which are secured to chassis 31. Bracket 39 and the corresponding bracket on the opposite side of the machine are attached to the ends of a bar which is pivotally connected at its center to the center of a horizontal member attached to the main frame. Similar springs 37 are connected to front axle 33, and the ends of springs 37 are connected to chassis 31 by brackets 41 and 42. This construction is shown in Figure 1.

Chassis 31 includes a pair of spaced parallel horizontally disposed beams 43, Figure 7, and extending upwardly from each of beams 43 is a stationary arm 44 (Fig. 8), substantially of L shape. The free end of arm 44 is connected to the upper end of a piston rod 45 (Fig. 7), and the piston rod 45 is slidably arranged in a hydraulic cylinder 46, cylinder 46 being secured to the axle 33 by a bracket 47. Cylinder 46 is arranged adjacent one of front wheels 34, and a similar hydraulic cylinder 48 (Fig. 3) is arranged adjacent the other front wheel 34. Thus, by causing hydraulic fluid to flow to cylinders 46 and 48, springs 37 can be compressed or expanded so that the vehicle frame can be leveled in order to provide compensation for uneven ground conditions.

A vertically disposed side plate 38 which may be made of any suitable material, such as steel, is dependingly supported by each side of chassis 31. It may be a part of beam 43. The vehicle of the present invention further includes a steering mechanism 49, Figure 1, and there is provided a seat 50 for supporting the operator or driver of the vehicle. An engine 53 which may be a conventional gasoline engine is arranged rearwardly of the seat 50, and extending upwardly from the chassis 31 is a cab frame 51 which serves to support a roof 52. The roof 52 serves to protect the vehicle operator whereby articles, such as logs, that are being transported will not accidentally fall and injure the vehicle operator.

Pivotally connected to the rear end of the chassis 31 adjacent each side thereof is a link 54, the pair of spaced parallel links 54 being pivotally connected to the chassis 31 by bolts or pins 55. A vertically disposed plate 56, which may be replaced by a heavy counterweight, is secured to the rear end of the chassis 31. A shaft 57 pivotally connects the rear end of a boom including arms 58 to the upper end of each of the links 54. Thus, it will be seen that there is provided a pair of the arms 58 which are arranged in spaced parallel relation with respect to each other.

Extending downwardly from the front end of each of the arms 58 is an inclined leg 59, and the pair of legs 59 are arranged in spaced parallel relation with respect to each other. A horizontally disposed shaft 66 pivotally connects a fork 60 to the front lower ends of the legs 59. Of course, some other carrier could be used instead of a fork. A clamshell gripper has been found very useful.

The fork 60 includes a pair of spaced parallel fingers 61, and arranged at right angles with respect to the fingers and secured thereto as by welding, is a pair of uprights 62. A cross-piece 63 extends between the upper ends of the uprights 62 and is secured thereto (Figure 3). A cylindrical brace 64 extends between the pair of legs 59 and is secured thereto, and the brace 64 helps maintain these parts in their proper spaced relation. Additional braces such as 64a may be provided. A body or corner brace 65 extends between each of the uprights 62 and the rear end of the adjacent fingers 61 and is secured to each as by welding. The fork 60 is adapted to engage the cargo or articles, such as logs or lumber, whereby these articles can be lifted, carried, loaded, and delivered as desired. Fork 60 is pivotally connected to the pair of legs 59 by means of a horizontally disposed shaft 66, the shaft 66 extending through the uprights 62.

Referring to Figure 3 of the drawings, there is shown the hydraulic mechanism for controlling the movement of fork 60. Arranged on the rear end of chassis 31 and secured thereto is a conventional hydraulic pump 67. Pump 67 (Fig. 3) is adapted to be actuated by a shaft 68 which is connected directly to the engine crankshaft. Extending between the pair of links 54 and secured thereto is a tank 69 which provides a reservoir for hydraulic fluid. Tank 69 may be formed of structural metal welded to links 54 to serve as a brace for them. A conduit or hose 70 extends between tank 69 and pump 67 so that hydraulic fluid can be pumped from tank 69 to pump 67, preferably aided by gravity.

A pressure line 71 is connected to pump 67, whereby the hydraulic fluid can be pumped throughout the system. A relief valve 72 is arranged in the pressure line 71, so that in the event the fluid pressure builds up too high in line 71, this pressure can pass through a return conduit 73 and be returned to tank 69.

A plurality of T-fittings 74, 75, 76 and 77 are arranged in pressure line 71 for a purpose to be later described. An elbow 78 is connected to one end of the pressure line 71.

A conduit 79 leads from T-fitting 74 to a valve 80. The various valves, though illustrated as rotary, are preferably of the sliding spool type and include a movable core 82 that is arranged in a casing 81. The core 82 is provided with a passageway 83, so that by properly positioning core 82, passageway 83 can connect conduit 79 with conduit 84 which leads to the bottom of hydraulic cylinder 46. A handle 87 is provided for moving the core 82. A T-fitting 85 connects conduit 84 with a conduit 86, and the conduit 86 leads to the upper end of the other hydraulic cylinder 48. As previously stated, one of the hydraulic cylinders 46 and 48 is arranged adjacent each of front wheels 34. With the valves set as shown, a conduit 88 serves as a return line for conveying hydraulic fluid from the top of cylinder 46 and the bottom of hydraulic cylinder 48 through a valve 93 and T-fitting 90 into a conduit 91, and conduit 91 communicates with return line 73. A hose or tube 89 connects the upper end of the hydraulic cylinder 46 to the conduit 88.

A conduit 92 leads from T-fitting 75 to valve 93 including a core 95 that is mounted in a casing 94. Core 95 is positioned by means of a handle 97, and core 95 is provided with a passageway 96 which is adapted to be arranged in communication with either conduit 92, the conduit 88, or a short conduit 98 which is connected to T-fitting 90.

The hydraulic system further includes a valve 99 which comprises a casing 100 having a core 101 movably mounted therein. The core 101 is moved by means of a handle 102, and the core 101 is provided with a passageway 104, there being a short conduit 103 leading from T-fitting 76 to casing 100. A conduit 105 is connected through a T-fitting 106 to a tube 107, and each end of tube 107 is connected to the upper end of a hydraulic cylinder 108.

The upper end of each of hydraulic cylinders 108 is pivotally connected to a bracket 109 by a pin 110, and brackets 109 are secured, as by welding, to the front end of each of arms 58. A piston rod 111 is reciprocally or slidably arranged in each of cylinders 108, and the lower front end of each of rods 111 is pivotally connected to the rear end of the complementary body member 65. Thus, by actuating hydraulic cylinders 108, fork 60 can be tilted or pivoted as desired.

A return conduit 112 has its opposite ends connected to the lower end of each of cylinders 108, and a T-fitting 113 is arranged in conduit 112. A line or hose 114 has one of its ends connected to T-fitting 113, while the other end of line 114 is connected to valve 99. A second passageway 115 is arranged in core 101, and passageway 115 is adapted to connect line 114 with a short conduit 116, the conduit 116 being connected to return line 73 by means of a T-fitting 117.

There is further provided a valve 118 which is connected to T-fitting 77 by a short conduit 119, valve 118 including a core 121 that is mounted in casing 120. A handle 122 is provided for moving core 121, and core 121 is provided with a passageway 123. A pressure conduit 124 connects valve 118 to a line 126, this connection being effected through a T-fitting 125. The ends of line 126 communicate with the lower ends of a pair of spaced parallel hydraulic cylinders 127, and the lower end of each of cylinders 127 is pivotally connected to side plates 38 by means of a pin 128.

Slidably or reciprocably arranged in each of casings 127 is a piston rod 129, and the upper ends of rods 129 are connected to a triangular shaped support member 130, there being one of the support members 130 secured, as by welding, to each of arms 58. Thus, upon proper actuating of hydraulic cylinders 127, rods 129 can be raised and lowered so that arms 58 can be pivoted about shaft 57.

The upper ends of cylinders 127 have connected thereto a conduit 131 for the egress therethrough of hydraulic fluid, and a T-fitting 132 connects a return line 133 to conduit 131. A second passageway 134 is arranged in the core 121, and the passageway 134 is adapted to connect the line 133 to a T-fitting 135 that is arranged in the return line 73.

Finally, there is provided a valve 136 which is connected to elbow 78 by conduit 137. Valve 136 includes a core 138 that is arranged in a casing 139, and a handle 140 is provided for moving core 138. Core 138 is provided with a passageway 141 that is adapted to connect conduit 137 with a conduit 142. Pressure line or conduit 142 is connected to a line 144 by means of a T-fitting 143, and the ends of conduit 144 are connected to the lower front ends of a pair of hydraulic cylinders 145. The pair of hydraulic cylinders 145 are pivotally connected to uprights 147 by means of pins 146, the uprights 147 being secured to each side of chassis 31. Slidably arranged in each of cylinders 145 is a piston rod 148, and each of piston rods 148 is pivotally connected between a pair of ears 149 by means of a pin 150, ears 149 being secured to links 54. Thus, by proper actuation of hydraulic cylinders 145, the pair of links 54 can be pivoted about pin 55. A conduit 151 connects the upper rear ends of the pair of hydraulic cylinders 145 to a conduit 153 by means of a T-fitting 152, and there is provided in core 138 a second passageway 154 whereby line 153 can be connected to a T-fitting 155 which is arranged in the return line 73.

It will of course be understood that the connections to each of the hydraulic cylinders can be reversed or shut off by suitable operation of the valves.

In use, the machine of the present invention can be used for lifting, carrying, and delivering various cargoes or articles, such as logs or lumber. In Figure 4, the fork 60 is shown in a lower or pick-up position whereby the cargo can be readily picked up from a truck, or other location. Then, in Figure 5, the parts are shown in an intermediate position, while in Figure 7, the parts are shown in the position they may occupy when the load is being carried. To cause this movement, the previously described hydraulic system is provided. Thus, the pump 67 which is actuated by the power take-off shaft 68 serves to force hydraulic fluid from the tank 69 through the line 70, then through the line 71. If the front of the machine is to be leveled in order to compensate for uneven ground conditions, either the valve 80 or the valve 93 or both can be actuated. With the valve 80 set as shown in Figure 3, hydraulic fluid will cause one of the springs 37 to be compressed and the other to be expanded so that the vehicle will be leveled. It will be seen that when the hydraulic fluid is entering the bottom of one of the cylinders 48 or 46, it will enter the top of the other and the choice of cylinders into which the fluid is to enter at the top depends upon the setting of the valves 93 and 80. Both valves may be shut off when leveling is complete and both may be opened to discharge to allow the springs to function.

Next, the links 54 can be pivoted or moved back and forth about the shaft 55 as shown in Figure 4 through 6. Thus, rearward or counterclockwise movement of the links 54 is caused by setting the valve 136 as shown in Figure 3. To pivot the links 54 in a clockwise direction, the core 138 is moved by means of the handle 140 so that the hydraulic fluid passes from the short conduit 137 through the passageway 154, into the conduit 153, then into the line 151 and then into the tops of the pair of hydraulic cylinders 145. Then the hydraulic fluid will leave through the line 144, T-fitting 143, conduit 142, passageway 141, T-fitting 155, and finally into the line 73 and back into the tank 69.

The fork 60 can be tilted or pivoted about the shaft 66 by means of the pair of hydraulic cylinders 108. The pair of cylinders 108 are controlled by the valve 99, so that by properly adjusting the valve 99, hydraulic fluid can either be directed into the tops or bottoms of these pair of cylinders 108, whereby the fork 60 can be pivoted to any desired angle. For raising or pivoting the pair of arms 58 about the shaft 57, the pair of hydraulic cylinders 127 are actuated. These cylinders 127 are actuated by means of hydraulic fluid, and the hydraulic fluid can either be directed into the tops or bottoms of these cylinders 127 by means of the control valve 118.

A pad or bracket 22 is secured, as by welding to the front end of each of the legs 59, and the pads 22 may rest on the front end of the chassis 31 when the load is being carried.

The machine of the present invention can be used for picking up and carrying logs, lumber, and other materials, and these materials can be carried to any desired place such as a truck platform or log deck. The machine is constructed so that a heavy load can be rested on the chassis whereby the strain on the lifting arms will be reduced. Also, since the load carrying fork is shifted rearwardly to its position of rest, the possibility of overturning of the vehicle or its tipping forwardly will be minimized. Also, the pivotal connection and hydraulic system enable the fork to have a long reach and to move forwardly under a load without rolling the wheels over rough ground. By means of the leveling cylinders 46 and 48, the machine can be used when working on uneven ground or the fork 60 can be arranged at an angle when lumber or other materials to be lifted are on a slant. When traveling over rough ground, the valves 93 and 80 can be set in a float position to allow free movement of the springs 37, so that these springs can carry the load.

Swaying of the boom laterally is kept within harmless limits by the cab which lies between the arms 58, and may fit fairly snugly. Thus the uprights 51 may serve as guides for arms 58. If the latter should be raised above the uprights they may be guided back by the curved roof structure or a curved guide above the roof. The leveling feature will avoid excessive rubbing of the arms 58 on the uprights 51 even though imperfect leveling or shifting after leveling would result in substantial swaying except for the cab. The normal clearance between the cab and arms can be just enough to avoid rubbing under level conditions, or it can be enough so that contact results only when the arms would otherwise sway far enough to place a severe strain on the arms or other parts.

If a clamshell gripper is used, the legs 59 are replaced by a downwardly extending frame at the end of a straight boom of about the same overall length. The frame may carry a hydraulic cylinder for opening and closing the clamshell and may be pivoted to the boom and swing by another hydraulic cylinder to let the clamshell hang down or to swing it to a horizontal angle. The clamshell may even be rotatable around an axis through it and the frame and be driven by a hydraulic motor. The clamshell gripper is preferably similar to a clamshell bucket, except for having no ends and being thinner when closed. Thus each side is a slim member which can slip between logs.

I claim:

1. A mobile machine for loading or the like including a mobile body, link structure pivoted at a first end to the body about a horizontal axis to swing through a nearly vertical position, a boom pivoted about at its rear end to the second end of said link structure about an axis parallel to the first axis, a load-engaging device carried by the boom at its front end, power means for pivoting said pivoted parts independently to advance and retract and raise and lower the device, and rest means adapted to support the weight of the load-engaging device on the body above the lowermost position of the load-engaging device independently of said link and of said power means when said boom is retracted and partially lowered, said rest being so positioned that if the boom is thrust forwardly, it may be lowered substantially further.

2. A mobile machine for loading or the like including an axle, a mobile body carried in part by the axle, a boom, means carried by the mobile body for raising and lowering the boom and for shifting it forwardly and rearwardly with respect to the body, a load-engaging device carried by the boom at its front end and having laterally-spaced slim portions adapted to be thrust simultaneously under a load, springs between the axle and the body, and means comprising jacks between the axle and body and fluid control means for the jacks for at will letting the springs function fully and at will alternately supplying pressure to the jacks for changing the angularity of the body to that on which it rests to raise one side of the boom and device with respect to the other side thereof to align the slim portions with the bottom of the load for entrance thereunder.

3. A mobile machine for loading or the like, including a mobile body, an upstanding link structure pivoted at its lower end to the rear of the body, a boom pivoted at its rear end to the upper end of said link structure about a horizontal axis, a load-engaging structure carried by the boom at its front end, and means for independently pivoting said link structure to advance and retract the boom while maintaining its slope relatively constant, and hydraulic cylinder means extending between the boom and the body substantially forwardly of said link structure and generally parallel to the link structure, and controllable independently of the first-named means, for raising the boom.

4. A mobile machine for loading or the like, including a mobile body, an upstanding link structure pivoted at its lower end to the body, a boom pivoted at its rear end to the upper end of said link structure about a horizontal axis, a load-engaging structure carried by the boom at its front end, and means for independently pivoting said link structure to advance and retract the boom while maintaining its slope relatively constant, and hydraulic cylinder means extending between the boom and the body substantially forwardly of said link structure and generally parallel to the link structure, and controllable independently of the first-named means, for raising the boom.

5. A mobile machine for loading or the like, including a mobile body, an upstanding link structure pivoted at its lower end to the body, a boom pivoted to the upper end of said link structure about a horizontal axis, a load-engaging structure carried by the boom at its front end, and means for independently pivoting said link structure to advance and retract the boom while maintaining its slope relatively constant, and hydraulic cylinder means extending between the boom and the body substantially spaced lengthwise of the boom from the said link structure and generally parallel to the link structure, and controllable independently of the first-named means, for raising the boom.

6. A mobile machine according to claim 4 in which the load engaging means includes vertically-slim load-supporting means suitable for sliding forwardly under a load and is pivoted to the boom for movement of said load-supporting means to a horizontal position at any position of the boom, and to a forwardly dumping position at any elevated position of the boom.

7. A mobile machine according to claim 4 in which the load engaging means includes vertically-slim load-supporting means suitable for sliding forwardly under a load and is pivoted to the boom for movement of said load-supporting means to a horizontal position over a wide range of boom elevations, and to a forwardly dumping position at elevated positions of the boom.

8. A mobile machine according to claim 4 in which the load engaging means is pivotally mounted to the boom to be movable to maintain a constant angularity as to the ground through all movements of the boom, and is adapted for dumping its load forwardly of the boom.

References Cited in the file of this patent

UNITED STATES PATENTS

| | | |
|---|---|---|
| 1,371,344 | Brackett | Mar. 15, 1921 |
| 1,710,632 | Main et al. | Apr. 23, 1929 |
| 2,348,899 | Guignard et al. | May 16, 1944 |
| 2,365,387 | Briscoe | Dec. 19, 1944 |
| 2,400,803 | Barnhart | May 21, 1946 |
| 2,413,096 | Barker | Dec. 24, 1946 |
| 2,441,070 | Hoover | May 4, 1948 |
| 2,458,195 | Pearse | Jan. 4, 1949 |
| 2,471,364 | Weber | May 24, 1949 |
| 2,560,674 | Westall | July 17, 1951 |
| 2,571,882 | Hudson et al. | Oct. 16, 1951 |
| 2,587,769 | Rowe | Mar. 4, 1952 |
| 2,600,739 | Dempster | June 17, 1952 |
| 2,606,417 | Richey | Aug. 12, 1952 |